(12) United States Patent
Goel et al.

(10) Patent No.: US 7,641,882 B2
(45) Date of Patent: Jan. 5, 2010

(54) FULLERENIC STRUCTURES AND SUCH STRUCTURES TETHERED TO CARBON MATERIALS

(75) Inventors: Anish Goel, Washington, DC (US); Jack B. Howard, Winchester, MA (US); John B. Vander Sande, Newbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/675,140

(22) Filed: Sep. 30, 2003

(65) Prior Publication Data

US 2005/0095191 A1 May 5, 2005

(51) Int. Cl.
*C01B 31/02* (2006.01)
(52) U.S. Cl. .............................. 423/445 B; 423/449.1; 423/449.2
(58) Field of Classification Search ...... 423/449.1–450, 423/445 B
See application file for complete search history.

(56) References Cited

U.S. PATENT DOCUMENTS

| 5,132,105 | A | * | 7/1992 | Remo | .......................... | 423/446 |
| 5,648,523 | A | * | 7/1997 | Chiang | ........................ | 562/100 |
| 5,851,503 | A | * | 12/1998 | Mitani et al. | ............ | 423/445 B |
| 6,358,375 | B1 | * | 3/2002 | Schwob | ...................... | 204/173 |
| 2002/0122754 | A1 | * | 9/2002 | Ryzhkov | ............... | 422/186.21 |

FOREIGN PATENT DOCUMENTS

JP 11-140342 * 5/1999

OTHER PUBLICATIONS

Taylor, R. and Walkton, R.M., The Chemistry of Fullerenes, 363 Nature 685 (Jun. 24, 1993).*
Taylor, et al., The chemistry of fullerenes, Nature 1993; 363: 685-693.*
Donnet, et al., Fullerenic carbon in carbon black furnaces, Carbon 2000; 38: 1885-1886.*
Burden, et al., In-situ Fullerene Formation—The Evidence Presented, Carbon 1998; 36(7-8): 1167-1173.*
Burden, et al., In-situ Fullerene Formation—The Evidence Presented [online] American Carbon Society [http://acs.omnibooksonline.com/papers/1997_ii376.pdf].*
Berezkin, Fullerenes as Nuclei of Carbon Black Particles, Physics of the Solid State 2000; 42(3) 580-585.*
Cataldo, The impact of a fullerene-like concept in carbon black science, Carbon 2002; 40: 157-162.*
Donnet, Black and White Fillers and Tire Compound, Rubber Chem. Tech. 1998; 71(3): 323-341.*

(Continued)

*Primary Examiner*—Stanley S. Silverman
*Assistant Examiner*—Daniel C. McCracken
(74) *Attorney, Agent, or Firm*—Choate Hall & Stewart LLP; Sam Pasternack

(57) ABSTRACT

The fullerenic structures include fullerenes having molecular weights less than that of $C_{60}$ with the exception of $C_{36}$ and fullerenes having molecular weights greater than $C_{60}$. Examples include fullerenes $C_{50}$, $C_{58}$, $C_{130}$, and $C_{176}$. Fullerenic structure chemically bonded to a carbon surface is also disclosed along with a method for tethering fullerenes to a carbon material. The method includes adding functionalized fullerene to a liquid suspension containing carbon material, drying the suspension to produce a powder, and heat treating the powder.

18 Claims, 8 Drawing Sheets

OTHER PUBLICATIONS

Goel, et al., Size analysis of single fullerene molecules by electron microscopy, Carbon 42 (2004) 1907-1915.*

Donnet, et al., Fullerenic carbon in carbon black furnaces, Carbon 2000; 38: 1879-1902.*

Prinzbach, et al., Gas-phase production and photoelectron spectroscopy of the smallest fullerene, C20, Nature 2000; 407: 60-63.*

Côté, et al., "Electron-Phonon Interactions in Solid $C_{36}$", *Physical Review Letters*, 81(3): 697-700, 1998.

Cox, et al., "Characterization of $C_{60}$ and $C_{70}$ Clusters", *J. Am. Chem. Soc.* 113: 2940-2944, 1991.

Füller, et al., "In Situ Observation of the Formation and Stability of Single Fullerene Molecules Under Electron Irradiation", *Chemical Physics Letters*, 254: 372-378, 1996.

Grieco, et al., "Fullerenic Carbon in Combustion-Generated Soot", *Carbon*, 38: 597-614, 2000.

Grieco, et al., "Fullerenes and Pah In Low-Pressure Premixed Benzene/Oxygen Flames", *Twenty-Seventh Symposium (International) on Combustion/The Combustion Institute*, 1669-1675, 1998.

Grossman, et al., "Electronic and Structural Properties of Molecular $C_{36}$", *Chemical Physics Letters*, 284: 344-349, 1998.

Hebgen, et al., "Synthesis of Fullerenes and Fullerenic Nanostructures in a Low-Pressure Benzene/Oxygen Diffusion Flame", *Proceedings of the Combustion Institute*, 28: 1397-1404, 2000.

Piskoti, et al., "$C_{36}$, A New Carbon Solid", *Nature*, 395(25): 771-774, 1998.

Richter, et al., "Generation of Higher Fullerenes in Flames", *The Journal of Physical Chemistry B*, 101(9): 1556-1560, 1997.

Ueda, T., "Carbon Black Pigment and Ink", 1-11, 1999.

Osterodt, J. and Vogtle, F., "C61Br2: A new synthesis of dibromomethanofullerene and mass spectrometric evidence of the carbon allotropes C121 and C122," Chem. Commun. (1996) pp. 547-548.

A. Goel et al., "Size analysis of single fullerence molecules by electron microscopy," Carbon 42 (2004) pp. 1907-1915.

T. Fuller and F. Banhart, "In situ observation of the formation and stability of single fullerene molecules under electron irradiation," Chem. Phys. Lett. 254 (1996) pp. 372-378.

K. Das Chowdhury et al., "Fullerenic nanostructures in flames," J. Mater. Res. 11 (1996) pp. 341-347.

J. Howard et al., "Carbon shells in flames," Nature 370 (1994) p. 603.

* cited by examiner

| Structure | Horizontal (Å) | Vertical (Å) | Average (Å) |
|---|---|---|---|
| a | 7.0 | 6.5 | 6.8 |
| b | 6.5 | 7.0 | 6.8 |
| c | 6.5 | 7.0 | 6.8 |
| d | 6.0 | 7.5 | 6.8 |
| e | 6.5 | 7.5 | 7.0 |

FULLERENIC STRUCTURES AND SUCH STRUCTURES TETHERED TO CARBON MATERIALS

The government has certain rights in this invention pursuant to Dept. of Energy Grant No. DE-FG02-85ER45179 and Grant No. DE-FG-0284ER13282.

BACKGROUND OF THE INVENTION

The present invention relates to fullerenic structures and such structures tethered to carbon materials.

Fullerenic structures are carbon compounds that include closed-caged compounds such as fullerenes and nanotubes. One of the first fullerenes discovered was the version containing 60 carbon atoms ($C_{60}$) made up of adjacent carbon pentagon and hexagon rings. Other fullerenes such as $C_{36}$, $C_{70}$, and $C_{90}$ have been observed and analyzed. It has been speculated that fullerenic structures both smaller than and larger than $C_{60}$ exist in, for example, combustion-generated soot.

Because fullerenic structures are small ($C_{60}$ has a diameter of approximately 7 Å) and typically occur in very low concentrations in soot, their presence is difficult to detect. Furthermore, fullerenes are difficult to detect and characterize because they are often very strongly bound to, or within, the material with which they are condensed in the synthesis process thereby preventing easy removal for chemical analysis. Examples are fullerenes smaller than $C_{60}$ all of which necessarily contain adjacent pentagons in their structure and are strongly curved and strained and hence more interactive leading to strong bonding. Similarly, fullerenes larger than may also be strongly bonded to other structures because the size of larger fullerenes facilitates extensive contact thereby increasing the opportunity for bonding interactions.

It has been suggested that fullerenes bound to carbon black pigment would be useful for making an improved ink for use in, for example, an inkjet printer. See, Japanese Laid Open Publication no. 11-140342, published May 25, 1999. This reference, however, does not establish the chemical bonding of fullerenes to carbon black.

SUMMARY OF THE INVENTION

In one aspect, the invention comprises fullerenes having a molecular weight less than that of $C_{60}$ with the exception of $C_{36}$. In another aspect, the invention comprises fullerenes $C_{50}$, $C_{58}$, $C_{130}$, and $C_{176}$. In another aspect, the invention is the above-mentioned fullerenes in an isolated state. In yet another aspect, the invention is a single-walled carbon nanotube having a diameter less than that of $C_{60}$ and not associated with a three-dimensional support matrix. In yet another aspect, the invention is a fullerenic structure including a fullerene chemically bonded to a carbonaceous material.

In still another aspect, the invention is a method for tethering fullerenes to a carbon material including the steps of adding functionalized fullerene to a liquid suspension containing a carbon material. The suspension is dried to produce a powder and the powder is heat treated to produce the fullerene chemically bound to the carbon material. In one embodiment of this aspect of the invention, the functionalized fullerene is dichloromethano [60] fullerene. This method may include the additional step of sealing the dried powder in a tube filled with an inert gas followed by heat treatment of the tube in a furnace.

DESCRIPTION OF THE PREFERRED EMBODIMENT

Figure 1:
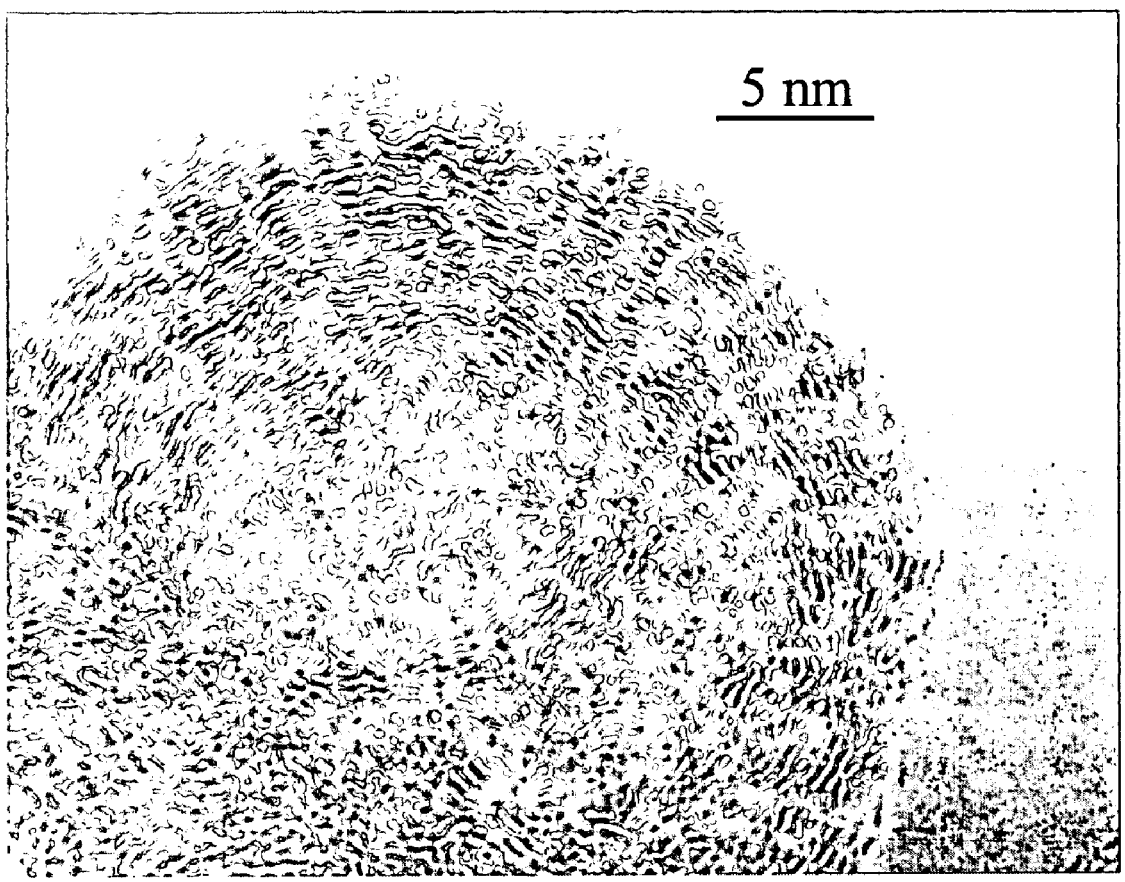
FIG. 1 is an HRTEM image of a particle from a pure carbon black sample.

As discussed above, detection of fullerenes is difficult because their concentration is low and they are often tightly bound to the material with which they were condensed in the synthesis process making removal for chemical analysis difficult. The composition of matter inventions disclosed herein have been observed using high resolution transmission electron microscopy (HRTEM). This technique provides a means for extending the detection and analysis of fullerenes to lower limits of detection than can be attained by conventional chemical analysis. For example, circular objects approximately the size of $C_{60}$ and $C_{70}$ fullerenes can be seen in HRTEM images of soot not only from certain low-pressure benzene/oxygen flames well known to contain fullerenes but also from atmospheric-pressure ethylene/air flames in which fullerenes could not be detected by state of the art chemical analysis. Grieco W J, Howard J B, Rainey L C, Vander Sande J B. Carbon 2000; 38:597. The contents of this reference and all of the references cited below are incorporated herein by reference.

Example 1

Three different samples were prepared for investigation by HRTEM. The first sample was pure carbon black (Regal 330; Cabot Corp.) suspended in a toluene solution. The other two samples were prepared from a portion of the carbon black-toluene solution to which was added a specified amount of dichloromethano[60]fullerene. In this functionalized fullerene, the carbon atom of the functional group is bridged to two carbon atoms of the fullerene molecule. After a uniform dispersion was ensured with vigorous mixing, the toluene was allowed to evaporate and the resulting dry powder mixture was sealed inside an argon-filled glass tube. The entire unit was then heat treated at approximately 400° C. for 4.5 hours in a tubular furnace (Lindberg Model 55036) and then cooled. The material was removed from the tube and divided into two parts. One of these two samples was not treated further and hence consisted of carbon black with tethered fullerenes and any fullerenes that remained untethered. This sample is referred to as pre-extraction. The other of these two samples was extracted by sonication in toluene for 13 minutes followed by vacuum filtration with a 0.45-µm nylon filter to remove any untethered fullerenes. Thus, this sample, referred to as post-extraction, consisted of carbon black with only tethered fullerenes.

A diluted suspension of each of the three samples in toluene was deposited onto a lacey carbon grid and the toluene was allowed to evaporate. The samples were analyzed in a JEOL 2010 electron microscope operating at 200 kV. The images obtained were analyzed for the presence of fullerene-type structures, i.e., structures that appear to be completely closed cages. In each image, the number of fullerene-type structures per length of perimeter, referred to as linear concentration, was determined and the diameter of each of those structures was measured. The data then were aggregated across all the images of a particular sample to provide fullerene linear concentration data and fullerene size distribution data.

Figure 2:
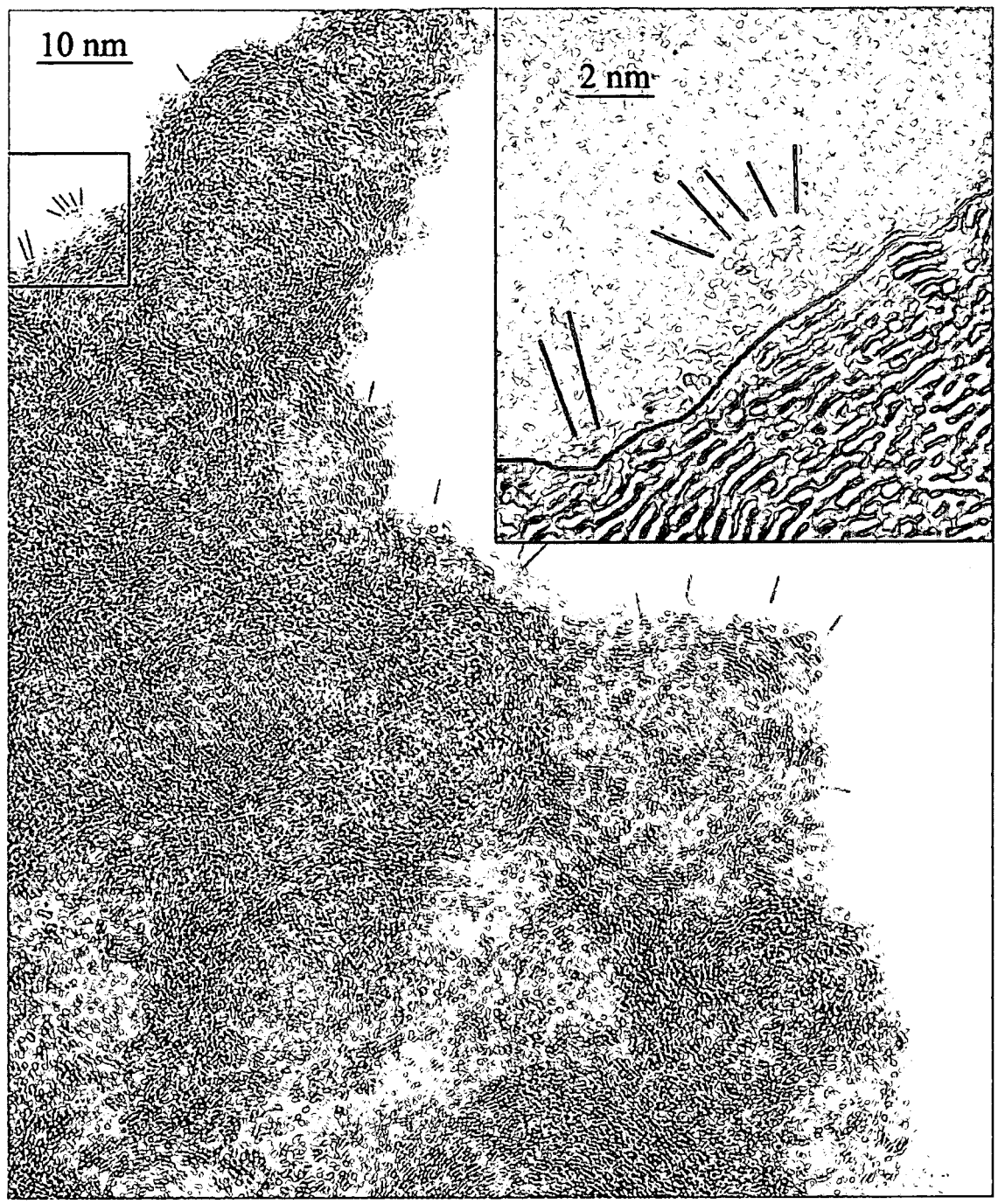
FIG. 2 is an HRTEM image of a particle from a post-extraction tethered fullerene sample.

FIGS. 1 and 2 show two images that are representative of the images analyzed from the different carbon black samples. FIG. 1 is an image of a particle taken from pure carbon black while FIG. 2 shows a particle from the post-extraction sample.

The black dashes in FIG. 2 are observer-added indications of structures that were deemed to be fullerenic and included in the concentration and size data. The absence of black dashes in FIG. 1 highlights the lack of fullerene-type structures in the carbon black sample. Only carbon structures along the periphery of the particles were analyzed as only the periphery was thin enough to allow for observation and accurate measurements of the structures. Hebgen P, Goel A, Howard J B, Rainey L C, Vander Sande J B. Proc Combust Inst 2000; 28:1397. The hand-drawn black line in the inset to FIG. 2 shows the boundary between the area that was analyzed and the particle interior, whose thickness presents too many stacked carbon layers to allow for accurate structural identification. It is unclear whether perceived structures in the particle interior inside the boundary are in fact single structures or the result of superpositioning of two or more different structures. Only the material outside the boundary was sufficiently thin to ensure interpretable observations. Qualitatively, the images show quite clearly that the carbon black doped with tethered fullerenes has many more fullerene-type structures than the pure carbon black particles.

Figure 3:
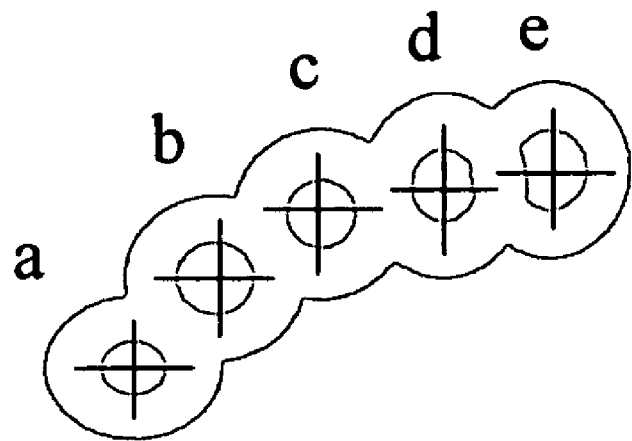
FIG. 3 is a cartoon illustrating the measurement method used for structure diameter size distribution determination.

Quantitative analyses of the same images reinforces the qualitative observation. FIG. 3 shows the method used to perform the quantitative analyses. It can be seen from this cartoon, corresponding to the five condensed structures in the inset to FIG. 2, that both vertical and horizontal height (diameter) were measured and then averaged. This averaged diameter was then used for size distribution purposes. Table 1 gives a summary of the fullerene concentration data.

TABLE 1

| Sample Number and Description | No. of Fullerenic Structures | Perimeter Length (nm) | Fullerenic Structures per 1000 nm of perimeter |
|---|---|---|---|
| 1. Without tethered $C_{60}$ | 21 | 1775 | 12 |
| 2. With tethered $C_{60}$; pre-extraction | 209 | 2220 | 94 |
| 3. With tethered $C_{60}$; post-extraction | 172 | 1970 | 87 |

From Table 1, it is seen that both samples containing tethered fullerenes have a fullerene concentration almost an order of magnitude greater than the concentration of what appears to be fullerenes in the pure carbon black sample. It should be noted that the post-extraction sample does have a slightly lower concentration than the pre-extraction samples. This is not surprising as it is expected that less than 100% of the functionalized fullerenes would react with the carbon black, leaving some untethered fullerenes to be separated during extraction.

It should be noted also that both the pre- and post-extraction samples exhibit concentrations less than what would correspond to the total amount of functionalized fullerenes added in the experiment. Considering the relative amounts of carbon black and functionalized fullerenes utilized, and assuming a uniform distribution of fullerenes over the superficial surface of the carbon black, the calculated area concentration of fullerene molecules would be 0.25 molecules/nm$^2$. The corresponding linear concentration of fullerenes would be 0.50 molecules/nm. Both tethered samples yield a linear concentration approximately 20% of this theoretical value indicating that many of the fullerenes are not observed. This result is not surprising given the difficulty of finding and observing fullerenes on the carbon black particles.

In an experimental situation similar to that disclosed herein, Cox et al. deposited $C_{60}$ on MgO crystals supported on holey carbon films. Cox D M, Behal S, Disko M, Gorun S M, Greaney M, Hsu C S, Kollin E B, Millar J, Robbins J, Robbins W, Sherwood R D, Tindall P. J Am Chem Soc 1991; 113:2940. Circular contrast patterns with about 0.8 nm diameter, consistent with that of $C_{60}$, were observed on the MgO crystals and could be seen most clearly on the edges of crystals hanging over holes in the support film. The circular images were not seen on MgO crystals without $C_{60}$ deposition. The Cox et al. work and the data presented above establish that the contrast observed, for instance in FIG. 2, is consistent with single $C_{60}$ molecules. It should be noted that the contrast in FIG. 2 is exactly analogous to that in FIG. 8, which is known to show $C_{60}$ molecules. The order of magnitude increase in observed fullerenic-type structures in doped-with-$C_{60}$ samples strengthens the conclusion that $C_{60}$ molecules are being observed. This coupled with the qualitative observations indicates quite strongly that fullerenes have been tethered to the carbon black surface, and furthermore, that these fullerenes are observable with HRTEM.

Nonetheless, precautions must be taken to reduce the influence of radiation damage and/or beam heating on the observations. Such influences include degradation of the sample, incorporation of smaller structures into larger ones, and migration of molecules. All three of these scenarios have been observed during HRTEM imaging and all can contribute to an artificially low frequency of fullerene observations. For example, we have observed $C_{60}$, and other fullerenic molecules, migrating "behind" the carbon black under some observation conditions, in accord with earlier reports. Fuller T, Banhart F. Chem Phys Lett 1996; 254:372.

Precautions must be taken to analyze images of a particular soot area at all possible focal lengths. The position of the soot particles along the optic axis of the instrument will create variations in contrast and image characteristics which can render some structures uninterpretable. This effect can compound errors due to other influences discussed above and, again, can suppress successful observation of fullerenic structures. Thorough focal series can help to alleviate this source of error.

While care is taken to minimize the effects of these imaging artifacts, some error will still be incorporated into the imaging results. This reduction in fullerenic structure observations gives a plausible explanation as to why, as mentioned above, the observations account for only 20% of the expected theoretical value. Normally, a 20% agreement would be cause for concern but given the fact that we observe still an orderof-magnitude increase in fullerenic structures with tethered fullerenes, our conclusions are not weakened.

The method disclosed herein tethers fullerene molecules by chemical bonding to a carbon surface. Those skilled in the art will appreciate that the method disclosed herein can be used to tether fullerenes to the same or other fullerenes or fullerene derivatives including endohedral fullerenes and metallized fullerenes, fullerenic nanostructures including single-walled and multi-walled carbon nanotubes, nested or onion structures or spherical, ellipsoidal, trigonous or other shapes, single- and multi-layered open cage structures of various radii of curvature, fullerenic soot and fullerenic black; and any form of graphitic carbon; any form of diamond; and any form of diamond-like carbon; and any form of amorphous carbon.

Those skilled in the art will further appreciate that the method disclosed herein is applicable to the situation in which the fullerene being tethered is a fullerene derivative or functionalized fullerene containing a functional group chosen so as to give the functionalized fullerene, and in turn the surface or material to which it is tethered, desired properties such as: acidic, basic, hydrophobic, hydrophilic, oxidizing, reducing, radical, metallic, electrical, magnetic, or other structural, chemical, biological or physical properties. It will also be appreciated that the tethers may differ in length, stiffness, electrical conductivity or other properties. For example, tethers of different lengths may be achieved by the use of chemical chains, such as aliphatic hydrocarbon chains of different lengths and tethers of different stiffness may be achieved by the use of chemical structures such as alkane, alkene, alkyne, fused or cross-linked aromatic structures, etc.

Example 2

Additional HRTEM analyses were performed on soot material collected from a premixed benzene/oxygen/argon flame that has been extensively characterized and studied previously. Grieco W J, Howard J B, Rainey L C, Vander Sande J B. Carbon 2000; 38:597; Grieco W J, Lafleur A L, Swallow K C, Richter H, Taghizadeh, K, Howard J B. Proc. Comb. Inst. 1998; 27:1669-1675. The conditions of this flame are: pressure, 40 Torr; gas velocity at burner, 25 cm/s (25° C.); fuel equivalence ratio, 2.4 (atomic C/O ratio, 0.96); and percentage diluent in feed gas, 10% argon. Samples of soot and all other condensables from this flame were collected in the manner described previously (Grieco W J, Howard J B, Rainey L C, VanderSande J B. Carbon 2000; 38:597) and HRTEM analysis was done using the same JEOL 2010 operating at 200 kV as in Example 1. Gold islands were deposited on the surface of several of these samples to provide a magnification calibration for the HRTEM images. Gold has a stable planar structure with a constant interplanar spacing of 2.039 Å for the {111} atomic planes. By observing and measuring this known spacing in an image, the image length scale thus is calibrated allowing the dimensions of other structures to be accurately measured. This calibration was used to measure the sizes of several of the closed-cage structures that were observed in the images and the data were compiled across all of the samples into a size distribution histogram.

The accuracy of the electron microscope as determined by the above calibration was ±0.01 nm. The accuracy of the measurement of the diameter of a fullerene molecule is limited by the observer's ability to identify the true edge of the hollow circular HRTEM image of the molecule. The observer was able to specify the diameter of the image of a fullerene molecule with a precision of ±0.01 nm or better.

Figure 4:
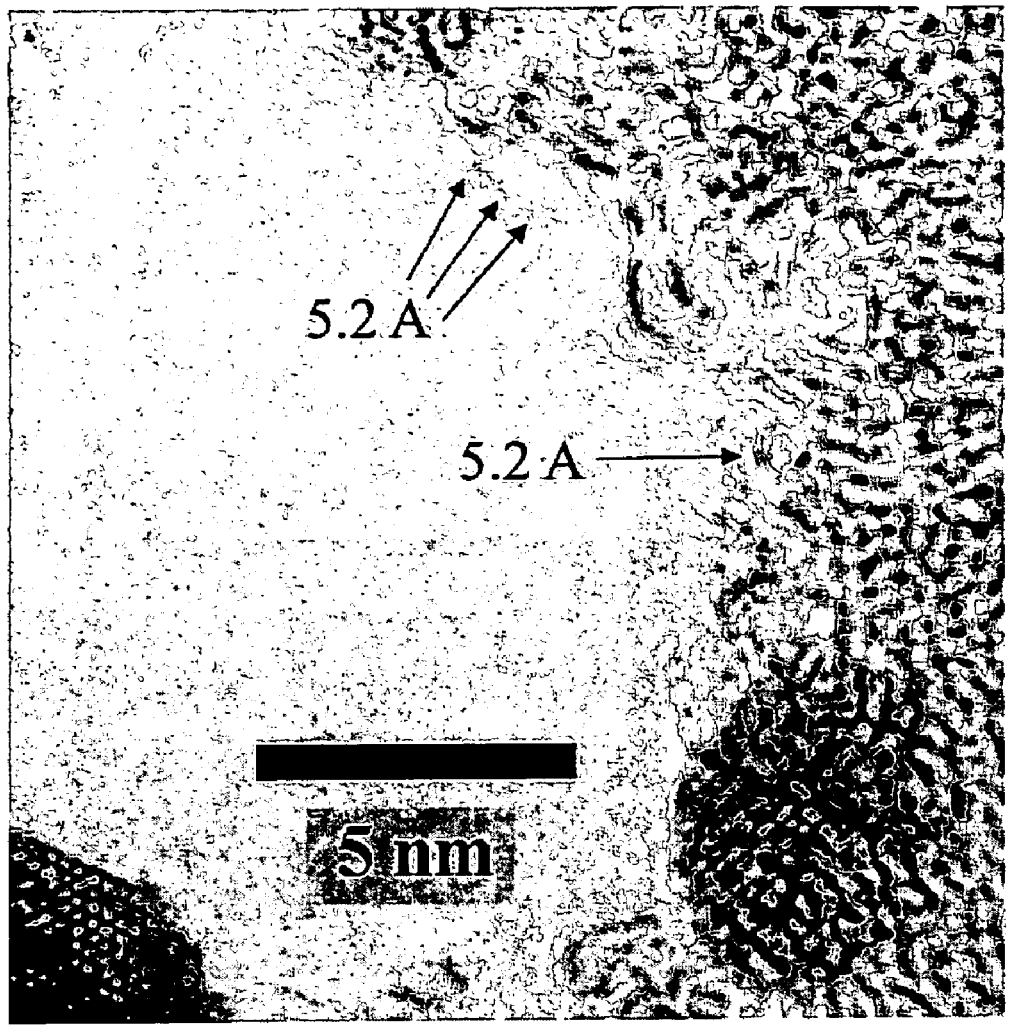
FIG. 4 is an HRTEM image of flame soot with gold island deposits and showing structures smaller than $C_{60}$.
Figure 5:
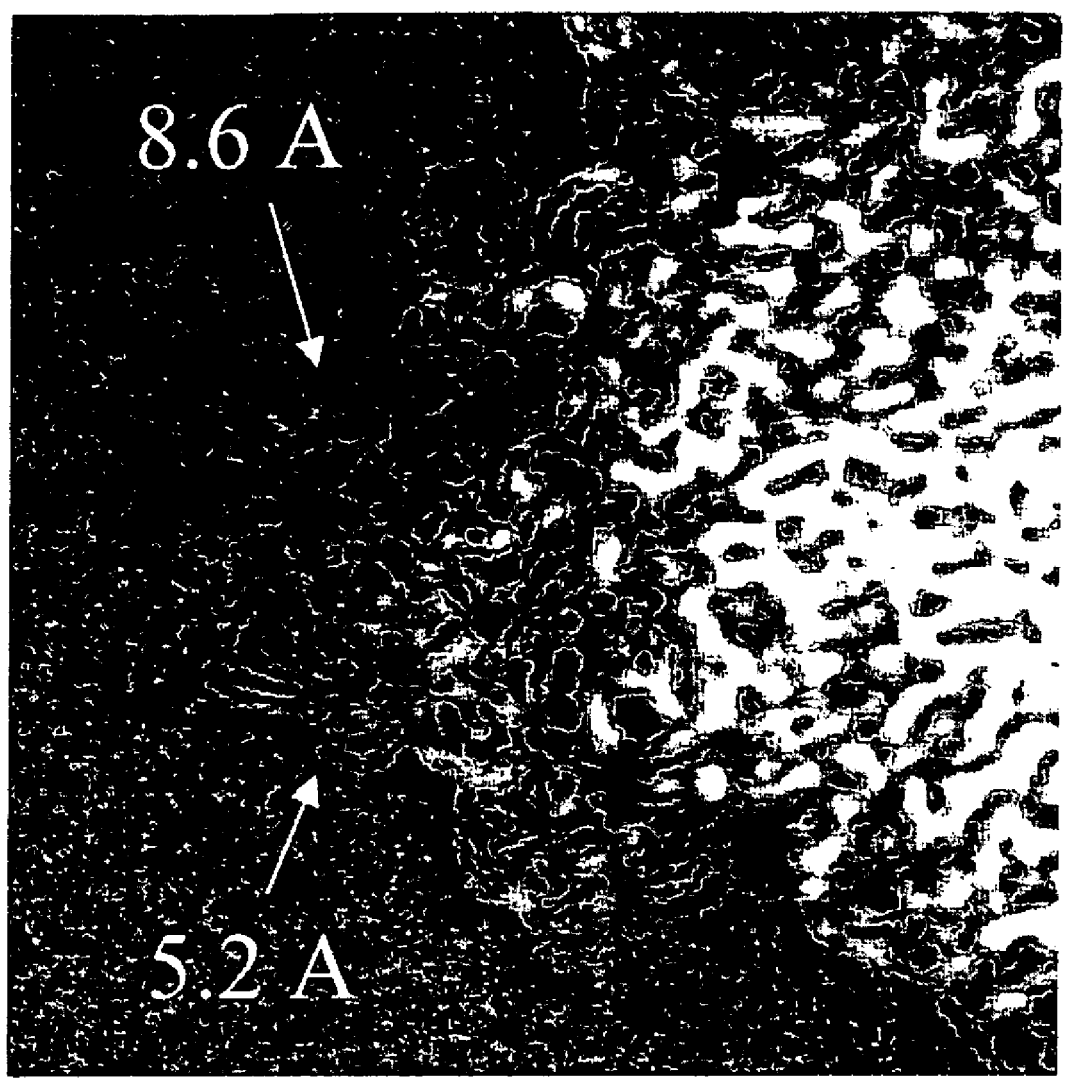
FIG. 5 is an HRTEM image of flame soot showing structures both larger and smaller than $C_{60}$.
Figure 6:
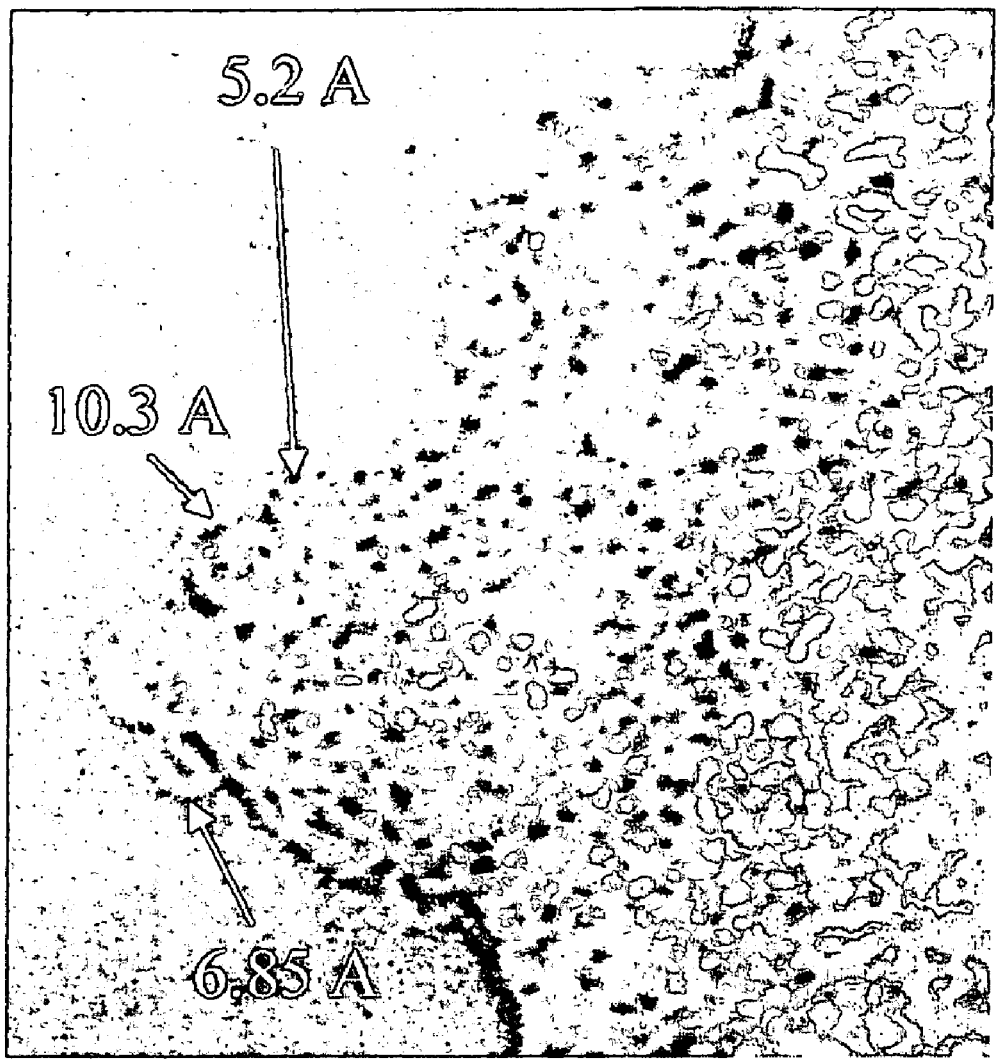
FIG. 6 is an HRTEM image of flame soot showing structures larger than, smaller than, and the size of, $C_{60}$

FIGS. 4 through 6 show representative images taken from the analysis of samples of flame-generated soot. The striped patterns on FIG. 4 are the lattice fringe images of the {111} planes from the deposits of gold that were used to calibrate the microscope. FIGS. 5 and 6 show other areas of the soot and several key structures are indicated by the arrows. The numbers associated with the highlighted structures are the observed diameters using the gold calibration as identified in FIG. 4. It can be seen from the indicated structures in FIGS. 4 through 6 that not only are structures the size of $C_{60}$ and larger observed (structures marked 6.85 Å, 8.6 Å, and 10.3 Å), but those smaller than $C_{60}$ are prevalent as well (structures marked 5.2 Å).

Figure 7:
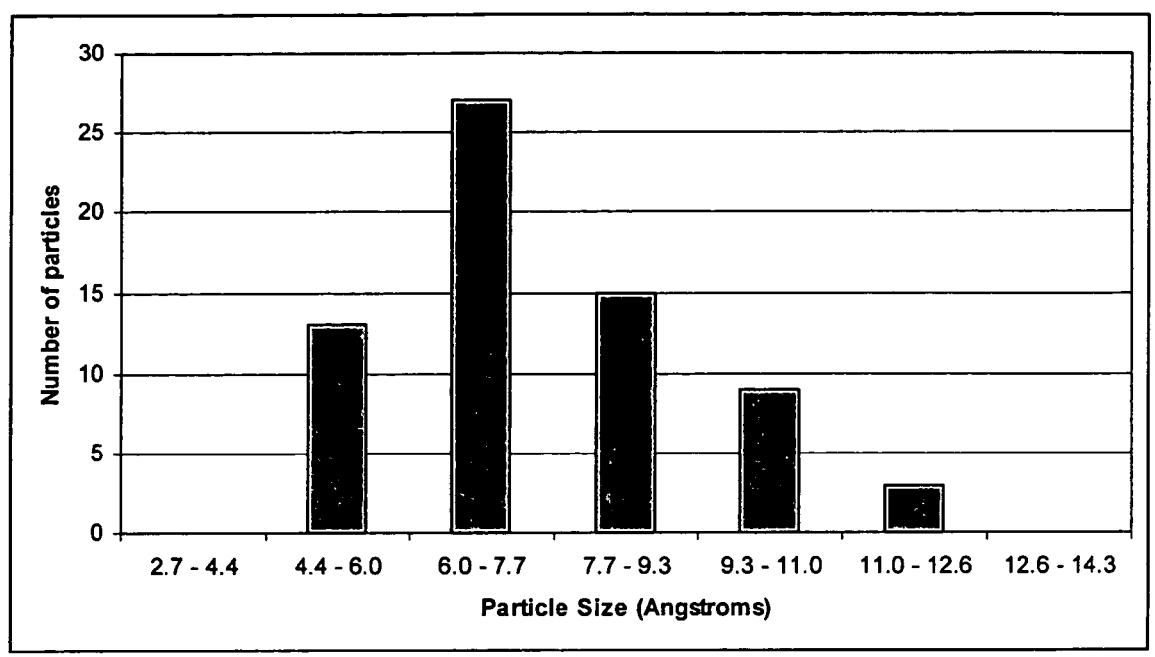
FIG. 7 is a size distribution histogram of structures measured in HRTEM images of flame-generated soot.

The size-distribution histogram obtained from the measurement of these structures is seen in FIG. 7. The size is an average of the major and minor axes of these, generally non-round structures. In the histogram, the numbers along the x-axis represent the bins that were used to separate out the measurements. The arbitrary nature of the bin sizes and cutoffs is a consequence of the resolution limit of the measurement technique. It can be seen from FIG. 7 that there is a significant peak in the bin containing 7 Å, which is the diameter of $C_{60}$. In addition, FIG. 7 shows that structures of average dimension both larger and smaller than $C_{60}$ are prevalent in the samples. This indicates that we are in fact observing and identifying structures that are not only larger than $C_{60}$ but smaller as well.

The gold island calibration method was developed and used to analyze images of flame-generated soot. The high precision and accuracy of this method give it a significant advantage over both the measurement method from Hebgen, et al. (Hebgen, P, Goel A, Howard J B, Rainey L C, VanderSande J B. Proc Combust Inst 2000; 28:1397) and the method used in the tethered fullerene Experiment 1 above. The observation of structures smaller than $C_{60}$ in the experiments using gold calibration (FIGS. 4 through 7) proves conclusively that such small structures do exist and that they are not artifacts of the method. The measured diameters range from about 0.5 nm to about 1.2 nm (see FIG. 7). A simple calculation using 0.7 nm as the diameter of $C_{60}$ and approximating all fullerene molecules as spherical shells whose mass is proportional to the square of the diameter gives 0.5 nm as the diameter of $C_{36}$ and 1.2 nm as the diameter of $C_{176}$. The diameter of $C_{36}$ as represented by the carbon center to carbon center distance has been reported to be 0.5 nm. (Cote M, Grossman J C, Louie S G, Cohen M L. Bull Am Phys Soc 1997; 42:270; Grossman J C, Cote M, Louie S G; Cohen M L. Bull Am Phys Soc 1997; 42:1576; and Grossman J C, Cote M, Louie S G, Cohen M L. Chem Phys Lett 1998; 284:344. Average diameters of selected structures marked for illustration in FIGS. 4-6 include 0.52 nm, 0.685 nm, 0.86 nm, and 1.03 nm, corresponding to $C_{36}$, $C_{58}$, $C_{90}$, and $C_{130}$.

Many other closed-cage structures with sizes corresponding to $C_{50}$ and other fullerenes, and fullerene-like structures larger than the $C_{176}$ mentioned above, were also observed. A striking feature of the observations was a preponderance of fullerenes that have not been observed in conventional chemical analyses, presumably because they are highly reactive and hence unstable and difficult to synthesize in observable quantities, or strongly attracted to soot or other carbon material with which they are formed and from which they are difficult to remove for chemical analysis. This observation provides grounds for expecting that other unstable species, such as $C_{20}$ and single-walled carbon nanotubes having diameters less than $C_{60}$ and not in a three-dimensional support matrix, could be stabilized on a carbon support and observed with the methods of this study. Fullerene $C_{20}$ has only been observed spectroscopically and for only fractions of a millisecond. Single-walled carbon nanotubes with diameters less than $C_{60}$ have only been observed within porous materials such as zeolites which provide a support structure within which the tubes are grown.

The confirmed existence of sub-$C_{60}$ fullerenes also indicates the presence of adjacent carbon pentagon rings in these fullerenes, which has important implications for bulk soot properties. Adjacent pentagons result in unique structural and electrical properties in the soot that can be exploited for the development of commercially useful products.

Example 3

The fullerenes observed in Example 2 are separated and isolated from the material with which they are condensed in the synthesis process. For fullerenes smaller than $C_{60}$ the fractionation and analysis methods of Piskoti et al. is used. Piskoti C, Yarger J, Zettl A. Nature 1998; 393:771. Fullerenes larger than $C_{60}$ are isolated by solvent extraction and high pressure liquid chromatography analysis. See, Richter H, Labrocca A J, Grieco W J, Taghizadeh K, Lafleur A L, Howard J B. J Phys Chem B 1997; 101:1556.

Example 4

A sample of $C_{60}$ molecules (99.5% pure; SES Corporation) was examined under HRTEM. The fullerenes were dissolved into toluene and drops of the solution were placed on TEM grids. The toluene was allowed to evaporate before the HRTEM analysis.

Figure 8:
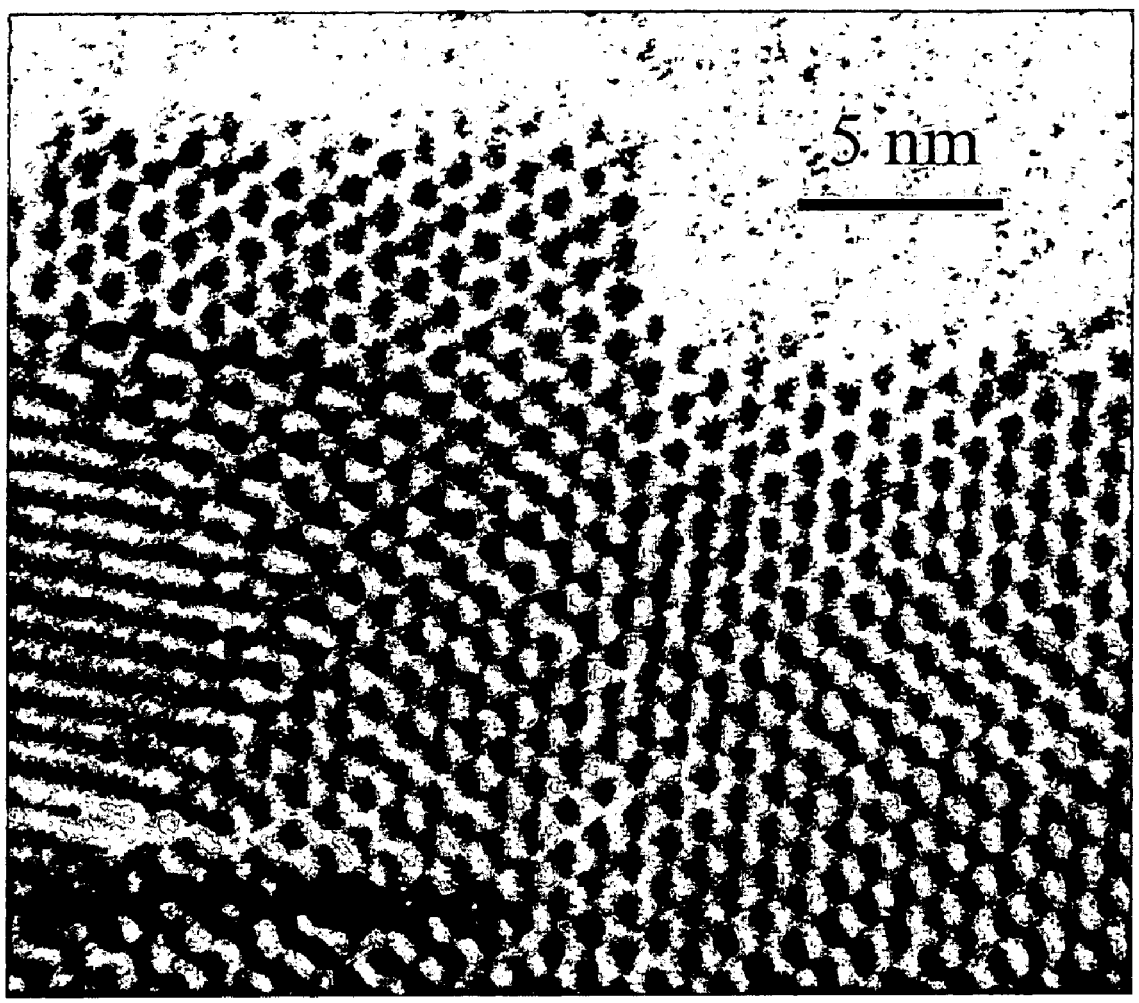
FIG. 8 is an HRTEM image of a pure $C_{60}$ sample.

FIG. 8 shows a representative HRTEM image from the analysis of $C_{60}$ precipitated from solution directly onto the TEM grid. The $C_{60}$ molecules have taken a crystalline form with a two-fold symmetry that is visible. Comparing the length scale to the black centers of the individual molecules reveals a diameter of about 0.7 nm as expected for $C_{60}$ molecules. The measured center-to-center distance between the molecules is 1.01 nm along two of the crystallographic directions and 1.14 nm along the third direction.

As stated earlier, the contents of all of the references cited in this specification are incorporated herein by reference.

It is recognized that modifications and variations of the invention as disclosed herein will be apparent to those skilled in the art, and it is intended that all such modifications and variations be included within the scope of the appended claims.

What is claimed is:

1. Fullerenic structures chemically bonded to a surface of a bulk carbon material wherein the average fullerene concentration on the surface of the bulk carbon material is at least 87 molecules per 1000 nanometers of perimeter.

2. The product of claim 1 wherein the chemically bound fullerenic structures are derived from functionalized fullerenes.

3. The product of claim 1 wherein the chemically bound fullerenic structures are derived from dichloromethano [60] fullerene.

4. A product comprising fullerenes chemically bonded to a surface of a bulk carbon material wherein the average fullerene concentration on the surface of the bulk carbon material is at least 87 molecules per 1000 nanometers of perimeter.

5. The product of claim 4 wherein the fullerenes are each chemically bonded to the bulk carbon material by a carbon atom bridged to two carbon atoms of the fullerene and two carbon atoms of the bulk carbon material.

6. The product of claim 4, wherein the size of the bulk carbon material is greater than about 10 nanometers.

7. The product of claim 4, wherein the size of the bulk carbon material is greater than about 50 nanometers.

8. The product of claim 4, wherein the size of the bulk carbon material is greater than about 100 nanometers.

9. The product of claim 4, wherein the chemically bound fullerenes are derived from functionalized fullerenes.

10. The product of claim 4, wherein the chemically bound fullerenes are derived from dichloromethano [60]fullerene.

11. The product of claim 4 wherein the fullerenes are selected from the group consisting of $C_{50}$, $C_{58}$, $C_{60}$, $C_{130}$, and, $C_{176}$, or any combination thereof.

12. The product of claim 11 wherein the bulk carbon material comprises carbon black particles.

13. The product of claim 12 wherein the fullerenes are each chemically bonded to carbon black by a carbon atom bridged to two carbon atoms of the fullerene and two carbon atoms of a carbon black particle.

14. The product of claim 12, wherein the size of the carbon black particle is greater than about 10 nanometers.

15. The product of claim 12, wherein the size of the carbon black particle is greater than about 50 nanometers.

16. The product of claim 12, wherein the size of the carbon black particle is greater than about 100 nanometers.

17. The product of claim 12, wherein the chemically bound fullerenes are derived from functionalized fullerenes.

18. The product of claim 12, wherein the chemically bound fullerenes are derived from dichloromethano [60]fullerene.

* * * * *

UNITED STATES PATENT AND TRADEMARK OFFICE
CERTIFICATE OF CORRECTION

PATENT NO. : 7,641,882 B2  Page 1 of 1
APPLICATION NO. : 10/675140
DATED : January 5, 2010
INVENTOR(S) : Goel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 145 days.

Signed and Sealed this

Twenty-first Day of December, 2010

David J. Kappos
*Director of the United States Patent and Trademark Office*